(12) United States Patent
Tung

(10) Patent No.: US 7,554,755 B2
(45) Date of Patent: Jun. 30, 2009

(54) APPARATUS FOR HOLDING OPTICAL LENSES

(75) Inventor: Tsai-Shih Tung, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/831,909

(22) Filed: Jul. 31, 2007

(65) Prior Publication Data

US 2008/0106812 A1    May 8, 2008

(30) Foreign Application Priority Data

Nov. 3, 2006    (CN)    .................. 2006 1 0063459

(51) Int. Cl.
 *G02B 7/02*    (2006.01)
(52) U.S. Cl. .................. 359/819; 359/811; 359/619; 250/208.1; 347/233
(58) Field of Classification Search .................. 359/811, 359/619, 621, 622, 652, 819–822; 396/429, 396/323, 327, 335, 209, 233, 275, 333, 340, 396/459, 73, 74; 355/20, 46; 348/143, 238, 348/340, 374; 356/125, 244; 451/390; 206/5, 206/5.1; 250/208.1, 216, 239; 257/431, 257/434, 440, 443; 353/30; 137/137, 901; 134/137, 901; 347/233, 237, 238, 241
See application file for complete search history.

(56) References Cited

U.S. PATENT DOCUMENTS

| | | | | |
|---|---|---|---|---|
| 4,496,243 A | * | 1/1985 | Machida | 356/244 |
| 5,128,808 A | * | 7/1992 | Dosaka | 359/821 |
| 5,617,131 A | * | 4/1997 | Murano et al. | 347/233 |
| 7,166,907 B2 | * | 1/2007 | Onishi et al. | 257/680 |
| 7,414,423 B2 | * | 8/2008 | Lu et al. | 324/765 |

FOREIGN PATENT DOCUMENTS

| | | |
|---|---|---|
| CN | 2538275 Y | 3/2003 |
| JP | 2003-225629 A | 8/2003 |

\* cited by examiner

*Primary Examiner*—Loha Ben
(74) *Attorney, Agent, or Firm*—Frank R. Niranjan

(57) ABSTRACT

An apparatus (10) for holding optical lenses (20) provided herein generally includes a holding member (100) and a cover member (200) coupling with the holding member. The holding member comprises a plurality of first through holes (110). Each of the plurality of the first through holes comprises a first portion (101) for receiving an optical lens (20) therein and a second portion (102) communicating with the first portion. A minimum breadth of the first portion is greater than a minimum breadth of the second portion. The cover member comprises a plurality of second through holes (201) corresponding to the first through holes of the holding member. The second through holes communicate with their corresponding first portions of the first through holes. A breadth of the second through holes is less than that of the first portions of the first through holes of the holding member.

18 Claims, 13 Drawing Sheets

APPARATUS FOR HOLDING OPTICAL LENSES

TECHNICAL FIELD

The present invention relates to an apparatus for holding optical lenses and, in particular, relates to an apparatus for holding optical lenses for use in a cleaning process.

BACKGROUND

Generally, optical lenses need to be cleaned before and after a sputtering process so as to remove contaminants on surfaces of the optical lenses therefrom, such as oil, dust. In the cleaning process, the optical lenses each should be held or clamped by some apparatus to avoid the optical lenses sticking to or impacting with each other.

Referring to FIG. 1, a conventional apparatus 30 for holding optical lenses 40 is shown. The apparatus 30 includes three holding posts 302 for holding the optical lenses 40 therebetween. Each of the holding posts 302 includes a plurality of V-shaped grooves 304 defined therein. Openings of the grooves 304 each have a greater breadth than that of the optical lenses 40. The optical lenses 40 are each held and supported by the three holding posts 302 in such a manner that the optical lenses 40 each have edges partly received in the corresponding grooves 304 of the holding posts 302. However, the edges of the optical lenses 40 in the grooves 304 do not come into contact with water, and are accordingly left uncleaned. Furthermore, the apparatus 30 is hard to operate because the three holding posts 302 need to be adjusted simultaneously for tightly holding the optical lenses 40.

What is needed, therefore, is an apparatus for holding the optical lenses during a cleaning process that is generally easy to operate and cleans effectively.

SUMMARY

In accordance with one aspect of the present invention, an apparatus for holding optical lenses provided herein generally includes a holding member and a cover member attached to the holding member. The holding member comprises a plurality of first through holes. Each of the plurality of the first through holes comprises a first portion for receiving an optical lens therein and a second portion being in communication with the first portion. A minimum breadth of the first portion being greater than a minimum breadth of the second portion. The cover member comprises a plurality of second through holes corresponding to the first through holes of the holding member. The second through holes respectively communicate with the first portions of the first through holes. A breadth of the second through holes is less than that of the first portions of the first through holes of the holding member.

In accordance with another aspect of the present invention, an apparatus for holding optical lenses provided herein comprises a holding member and a cover member coupling with the holding member. The holding member includes a plurality of first through holes defined therein. A plurality of inner steps are formed in the respective first through holes, the inner steps configured for supporting optical lenses. The cover member faces the inner steps of the holding member. The cover member includes a plurality of second through holes communicating with the first through holes of the holding member.

These and other features, aspects, and advantages of the present method will become more apparent from the following detailed description and claims, and the accompanying drawings.

BRIEF DESCRIPTION OF THE DRAWINGS

Many aspects of the present apparatus for holding optical lens can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE PREFERRED EMBODIMENTS

Figure 1:
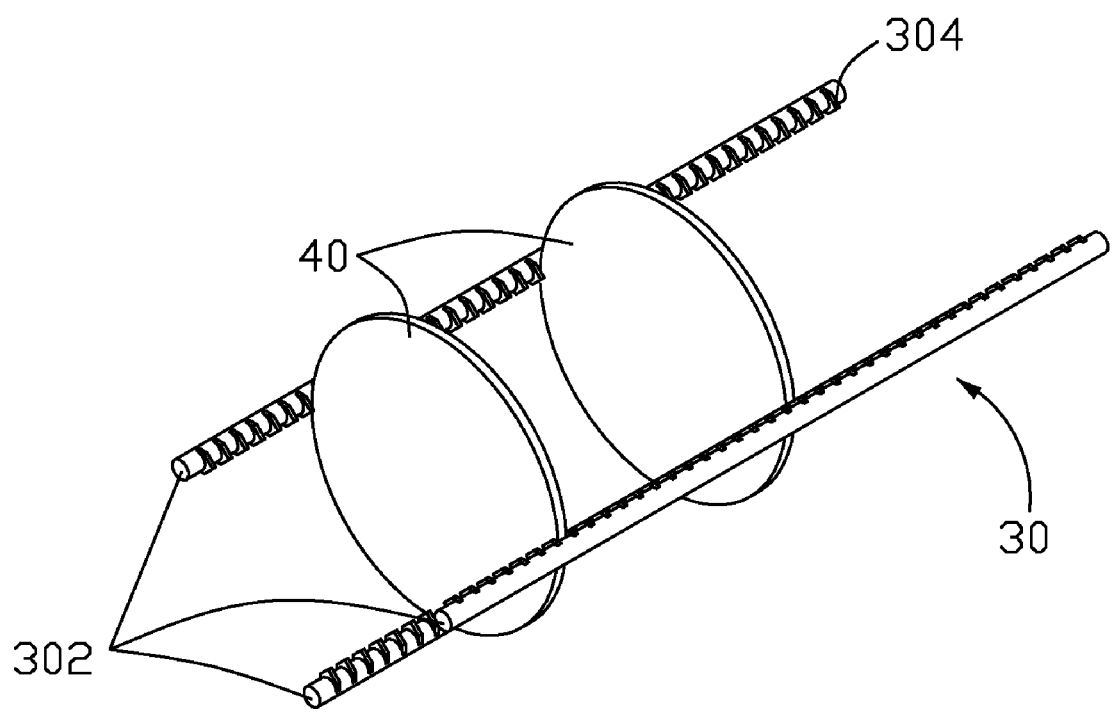
FIG. 1 is a schematic view of a conventional apparatus for holding optical lenses.
Figure 2:
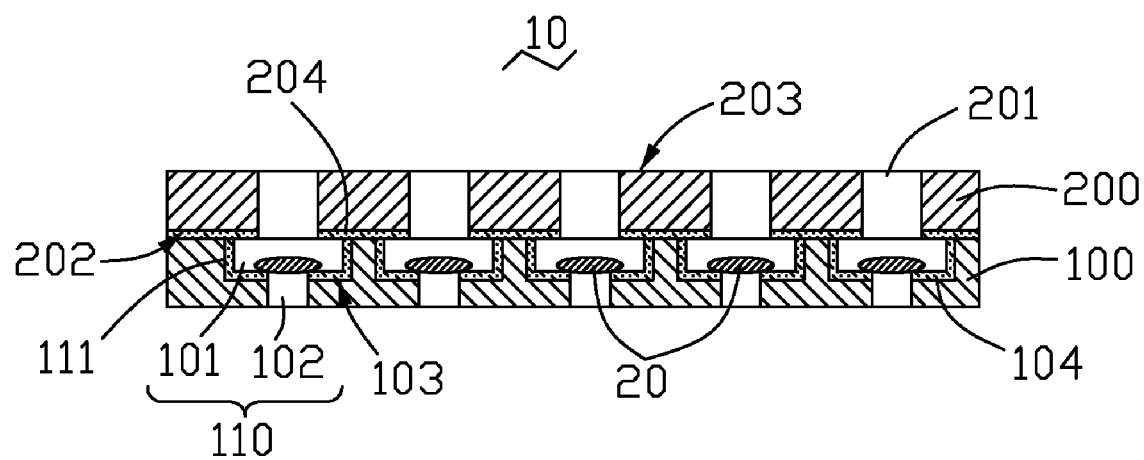
FIG. 2 is a schematic, section view of an apparatus for holding optical lenses, in accordance with a first embodiment, the apparatus including a holding member and a cover member attached to the holding member.

Referring to FIG. 2, an apparatus 10 for holding optical lenses 20 provided herein according to a first embodiment of the present invention is shown. The apparatus 10 generally includes a holding member 100 and a cover member 200 attached to the holding member 100.

The holding member 100 includes a plurality of first through holes 110. Each of the first through holes 110 are surrounded by an inner surface 111. A plurality of inner steps 103 are formed in the respective first through holes 110. Accordingly, each of the plurality of the first through holes 110 forms a first portion 101 and a second portion 102 in communication with the first portion 101. A minimum breadth of the first portion 101 is greater than a minimum breadth of the second portion 102. The first portions 101 are each configured for receiving an optical lens 20 therein. The second portions 102 are configured for allowing water to flow in or out thereof in a cleaning process such that the optical lenses 20 received in the first portions 101 are washed using the water.

In order to quickly dry the optical lenses 20 after the cleaning process, each of the first through holes 110 of the holding member 100 preferably includes a water repellent coating 104 on the inner surface 111 thereof. In the present embodiment, the water repellent coating 104 is disposed on an inner surface surrounding the first portion 101 and the inner step 103. Advantageously, the water repellent coating 104 is composed of high temperature resistant water repellent material, such as Teflon.

The cover member 200 includes a plurality of second through holes 201 corresponding to the first through holes 110 of the holding member 100. The second through holes 201 respectively communicate with the first portions 101 of the first through holes 110. Similar to the second portions 102 of the holding member 100, the second through holes 201 of the cover member 200 are also configured for allowing water to flow into or out of the first portions 101 of the holding member 100 and clean the optical lenses 20 received therein in the cleaning process. A breadth of the second through holes 201 is less than that of the first portions 101 such that the cover member 200 can keep the optical lenses 20 held in the first portions 101 in the cleaning process. Preferably, the second through holes 201 of the cover member 200 are concentric with the first and second portions 101, 102 of the holding member 100. Furthermore, the cover member 200 includes a contact surface 202 connecting with the holding member 100 and an opposite surface 203. In this present embodiment, the contact surface 202 includes a water repellent coating 204 thereon for preventing water from attaching on the contact surface 202 in order to consume less time in a following drying process.

Figure 3:
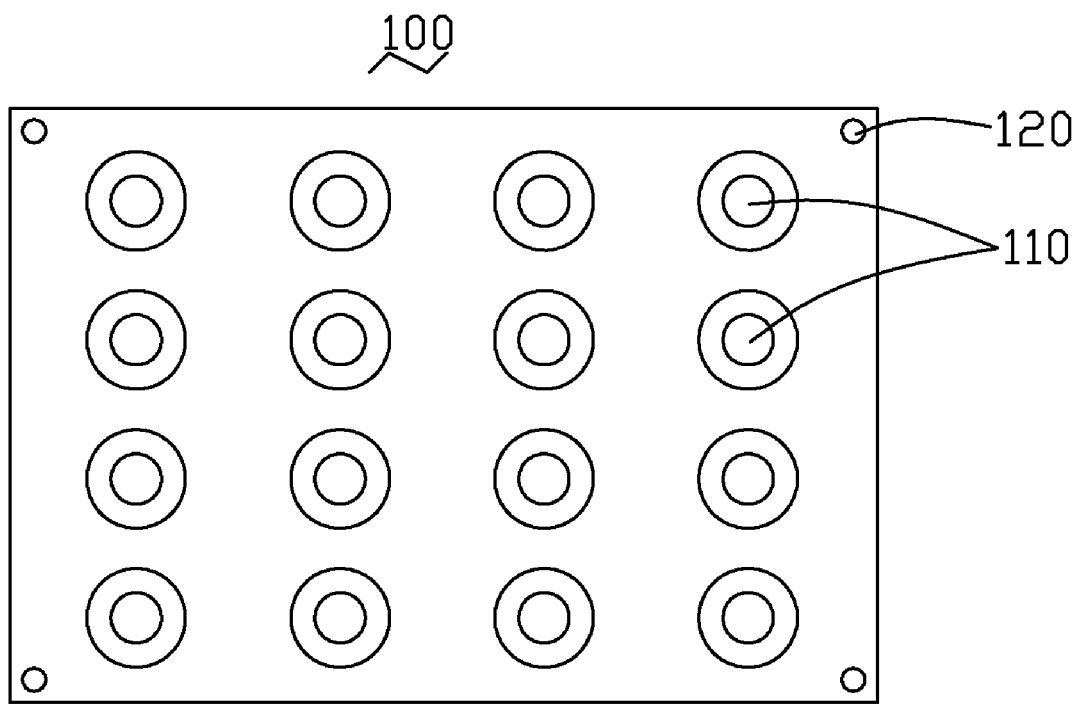
FIG. 3 is a schematic, top view of the holding member of the apparatus as shown in FIG. 2.

Referring to FIG. 3, a top view of the holding members 100 according to the present embodiment is shown. The first through holes 110 are arranged in columns and rows, i.e., an array. The holding member 100 includes four fastening holes 120 defined in four corners thereof, for securing with the cover member 200 using screws.

Figure 4:
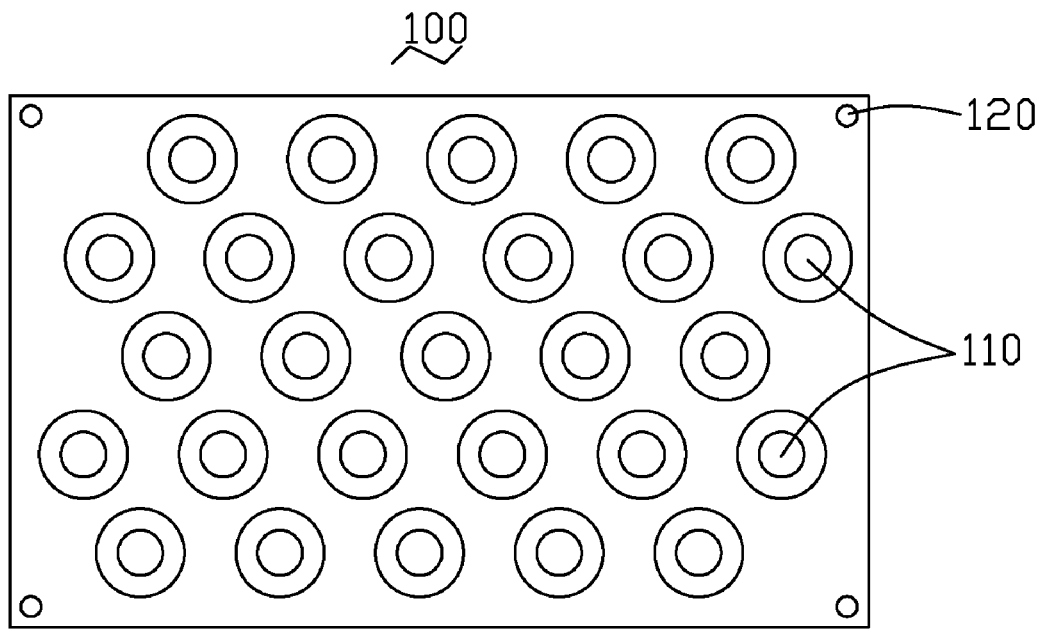
FIG. 4 is a schematic, top view of an alternative holding member of the apparatus as shown in FIG. 2.

Alternatively, the first through holes 110 can be arranged in a staggered fashion as shown in FIG. 4. Correspondingly, if the area of the hold member 100 is kept unchanged, a quantity of the first through holes 110 arranged in the staggered fashion is greater than that of the first through holes 110 arranged in columns and rows.

Figure 5:
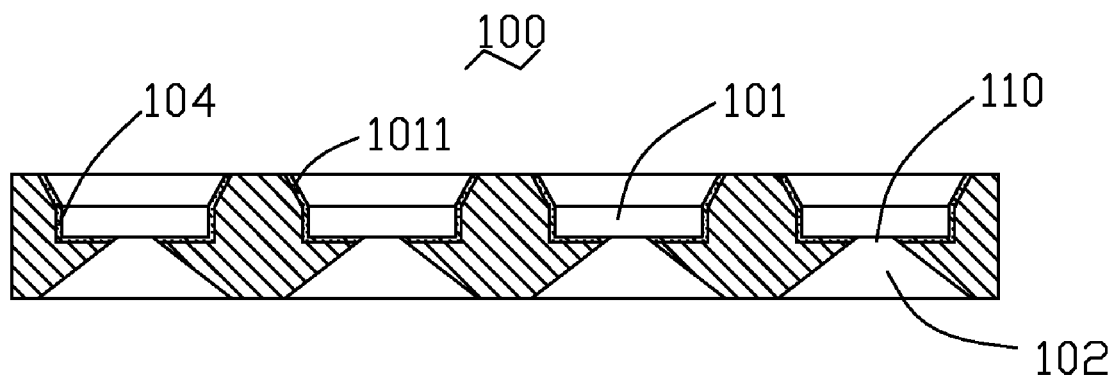
FIG. 5 is a schematic, section view of another alternative holding member of the apparatus as shown in FIG. 2.

Referring to FIG. 5, in another alternative embodiment, the first portions 101 of the first through holes 110 each have an enlarged section proximate to the cover member 200 (not shown in FIG. 5). The enlarged section is progressively constricted inward, corresponding to a tapered inner wall 1011 of the holding member 100. That is, the first portions 101 of the first through holes 110 each have an enlarged opening facing the cover member 200. The optical lenses 20 are thereby easily placed into the first portions 101 of the first through holes 110. Furthermore, the second portions 102 of the first through holes 110 each have a funnel shape for allowing water to easily flow in or out. A breadth of each of the second portions 102 progressively increases along a direction away from the cover member 200.

Figure 6:
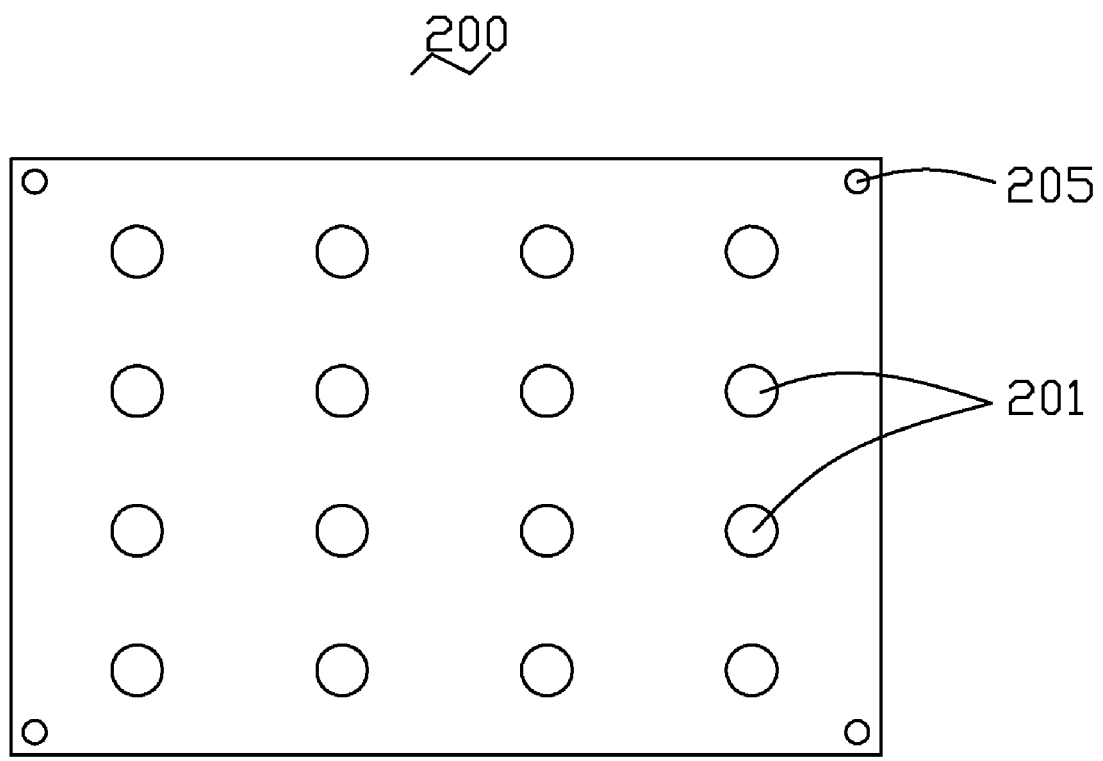
FIG. 6 is a schematic, top view of the cover member of the apparatus as shown in FIG. 2.
Figure 7:
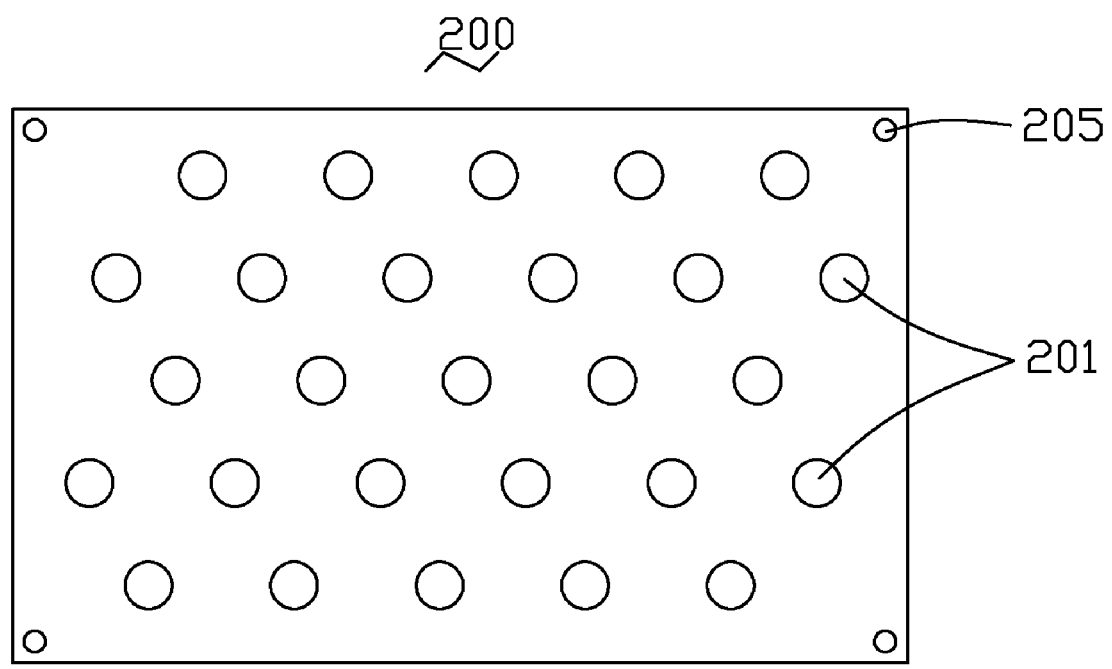
FIG. 7 is a schematic, top view of an alternative cover member of the apparatus as shown in FIG. 2.

Referring to FIG. 6, a top view of the cover members 200 according to the present embodiment is shown. In accordance with the arrangement of the first through holes 110 of the holding member 100 as shown in FIG. 3, the second through holes 201 of the cover member 200 are also arranged in columns and rows. The cover member 200 includes four fastening holes 205 defined in four corners thereof. The fastening holes 205 of the cover member 200 correspond to the fastening holes 120 of the holding member 100.

Alternatively, the second through holes 201 of the cover member 200 are arranged in a staggered fashion according to the arrangement of the first through holes 110 of the holding member 100 as shown in FIG. 4.

Figure 8:
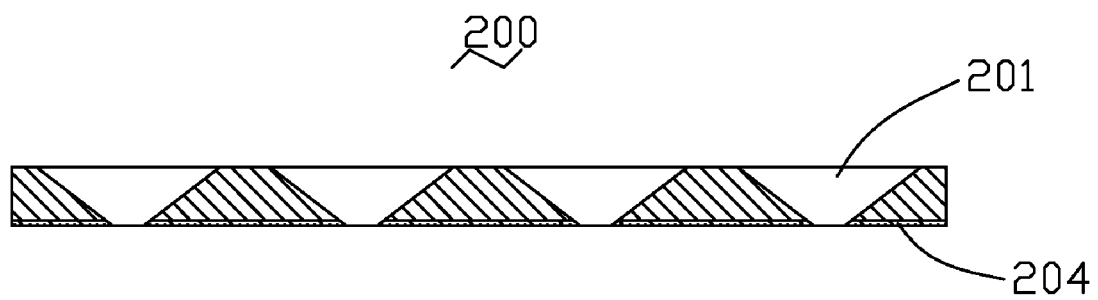
FIG. 8 is a schematic, section view of another alternative cover member of the apparatus as shown in FIG. 2.

Referring to FIG. 8, the second through holes 201 of the cover member 200 each have a funnel shape for making water easily flowing in or out therefrom. A breadth of the second through holes 201 progressively increases along a direction away from the holding member 200.

Figure 9:
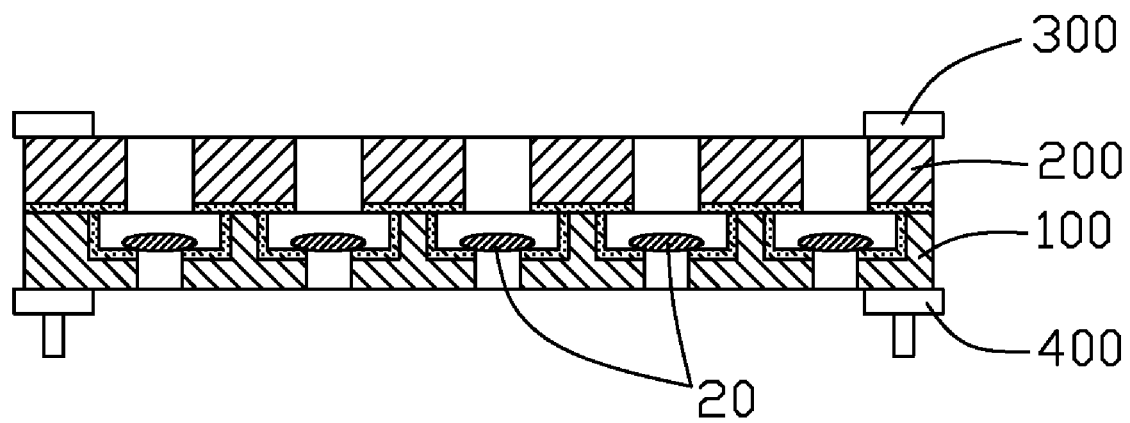
FIG. 9 is a schematic, assembled section view of the apparatus, as shown in FIG. 2, during a cleaning process.
Figure 10:
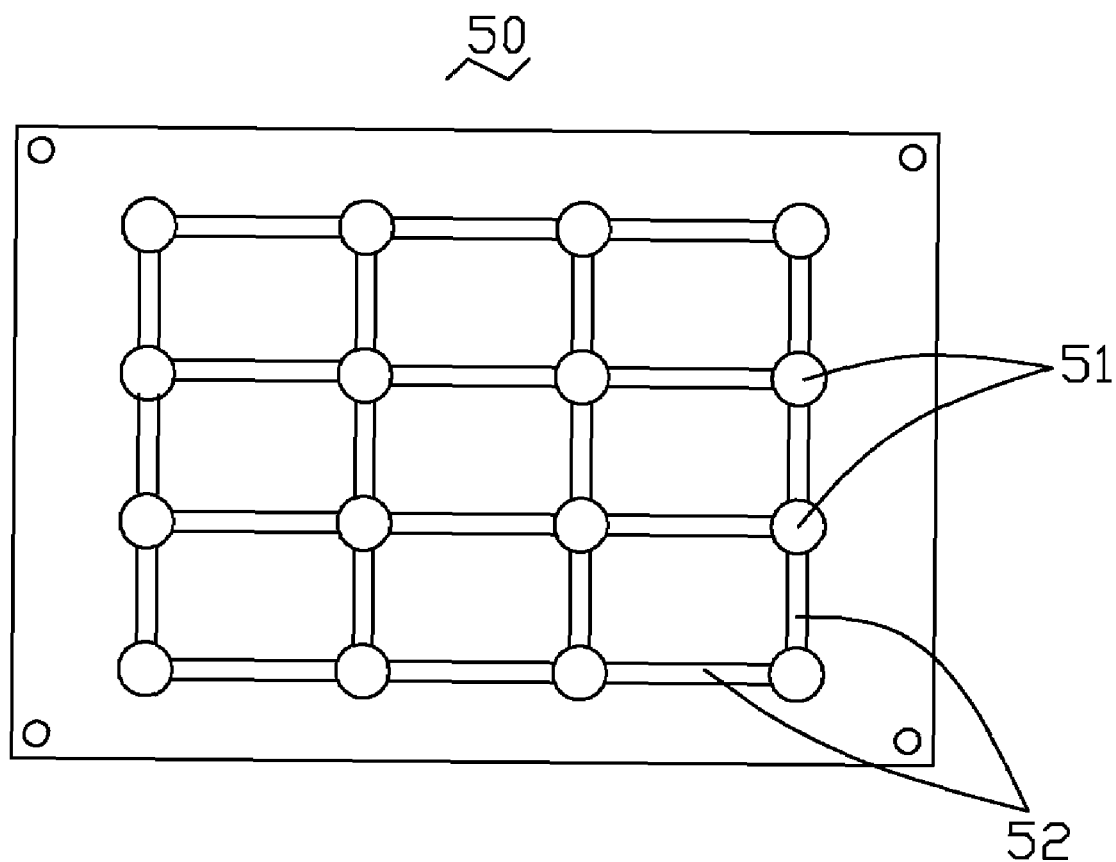
FIG. 10 is a schematic, top-down view of a holding member of an apparatus for holding optical lenses, in accordance with a second embodiment.
Figure 11:
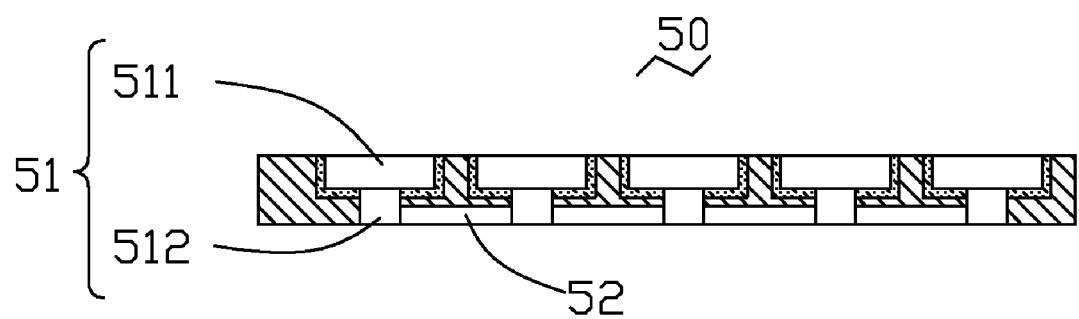
FIG. 11 is a schematic, section view of the holding member, as shown in FIG. 10.
Figure 12:
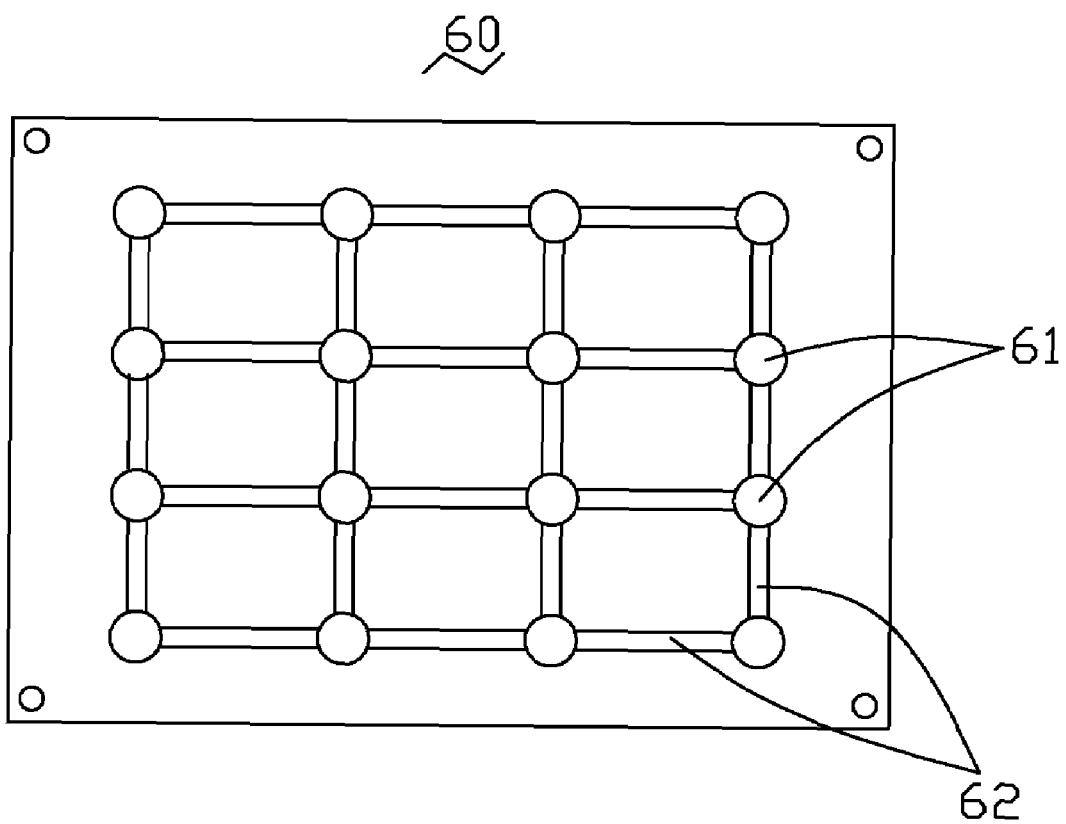
FIG. 12 is a schematic, bottom-up view of a cover member of the apparatus for holding optical lenses, in accordance with the second embodiment.
Figure 13:
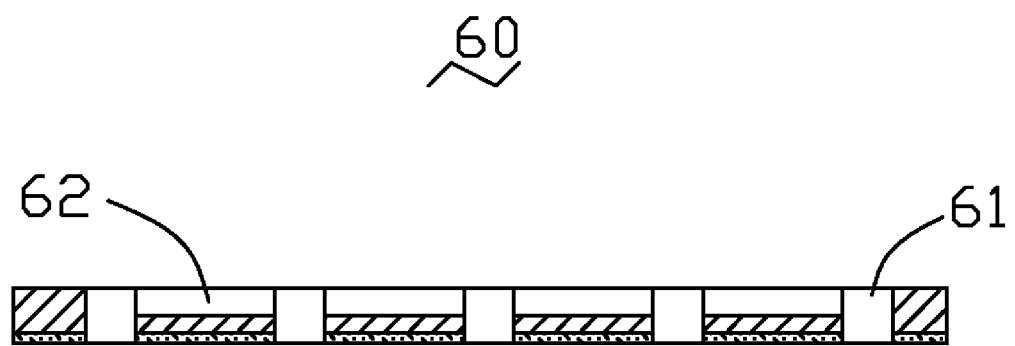
FIG. 13 is a schematic, section view of the cover member, as shown in FIG. 12.

Referring to FIG. 9, in the cleaning process, firstly, the optical lenses 20 are placed into the first portions 101 of the first through holes 110 of the holding member 100 thereby being supported by the inner step 103. Secondly, the cover member 200 is secured with the holding member 100 by jointing bolts 300 with nuts 400 via the fastening holes 120, 205. Thirdly, water, or other cleaning liquid, is used to clean the optical lenses 20 received in the apparatus for holding optical lenses 10. During the cleaning process, the optical lenses 20 are held in the first portions 101 of the first through holes 110 by the inner steps 103 and the cover member 200, and cannot drop from the apparatus for holding optical lenses 10. The water can easily flow in to or out of the apparatus for holding optical lenses 10 and cleans most of the optical lenses 20 because the second through holes 201 of the cover member 200 communicates with the first and second portions 101, 102 of the holding member 100. Contaminants on the optical lenses 20 will then be easily and substantially removed.

It should be understood by those skilled in the art that the numbers and locations of the fastening holes 120, 205 can be modified if desired, and are not intended to limit the present invention. Selectively, the cover member 200 and the holding member 100 can be secured with each other by other conventional fastening means, such as clamp fastening.

Referring to FIGS. 10 to 13, in a second embodiment, an apparatus for holding optical lenses includes a holding member 50 and a cover member 60 for coupling therewith. The holding member 50 includes a plurality of first through holes 51 defined therein. Each of the first through holes 51 is surrounded by an inner surface. A plurality of inner steps (not labeled) are formed in the first through holes 51, respectively. Accordingly, each of the plurality of the first through holes 51 forms a first portion 511 and a second portion 512 in communication with the first portion 511. The cover member 60 includes a plurality of second through holes 61.

Compared with the apparatus 10 of the first embodiment, the main difference is that the holding member 50 includes a plurality of channels 52 defined in a surface thereof away from the cover member 60. The grooves 52 connect between two neighbouring first through holes 51, and are communicated with the second portions 512 of the first through holes 51. Similarly, the cover member 60 also includes a plurality of channels 62 defined in a surface thereof away from the holding member 50. As a result, in the cleaning process, the water can easily flow in or out of the channels 52, 62. A cleaning effect is thereby enhanced.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. An apparatus for holding optical lenses comprising:
  a holding member comprising a plurality of first through holes, each of the plurality of the first through holes comprising a first portion for receiving an optical lens therein and a second portion being in communication with the first portion, a minimum breadth of the first portion being greater than a minimum breadth of the second portion; and
  a cover member attached to the holding member, the cover member comprising:

a contact surface facing toward the holding member, and a water repellent coating on the contact surface; and a plurality of second through holes corresponding to the first through holes of the holding member, the second through holes being in communication with the first portions of the first through holes respectively, a breadth of the second through holes being less than that of the first portions.

2. The apparatus for holding optical lenses according to claim 1, wherein the holding member comprises a water repellent coating formed on an inner surface surrounding each of the first through holes.

3. The apparatus for holding optical lenses according to claim 1, wherein the second through holes of the cover member each have a funnel shape, and the breadth of the second through holes progressively increases along a direction away from the holding member.

4. The apparatus for holding optical lenses according to claim 1, wherein the holding member is secured to the cover member by screws.

5. The apparatus for holding optical lenses according to claim 1, wherein the cover member comprises a surface facing away from the holding member, and a plurality of grooves defined therein and communicating with the second through holes of the cover member.

6. The apparatus for holding optical lenses according to claim 1, wherein the first through holes of the holding member are arranged in columns and rows.

7. The apparatus for holding optical lenses according to claim 1, wherein the first through holes of the holding member are arranged in staggered fashion.

8. The apparatus for holding optical lenses according to claim 1, wherein the holding member comprises a surface facing away from the cover member, and a plurality of grooves defined therein and communicating with the first through holes of the holding member.

9. The apparatus for holding optical lenses according to claim 1, wherein the first portions of the first through holes each have an enlarged section proximate to the cover member, the enlarged section being progressively constricted inward.

10. The apparatus for holding optical lenses according to claim 1, wherein the second portions of the first through holes of the holding member each have a funnel shape, and a breadth of the second portions of the first through holes progressively increases along a direction away from the cover member.

11. The apparatus for holding optical lenses according to claim 1, wherein the first portions and second portions of the first through holes share a common central axis.

12. An apparatus for holding optical lenses, the apparatus comprising:

a holding member including:

a plurality of first through holes defined therein, and a plurality of inner steps formed in the respective first through holes, each inner step being configured for supporting an optical lens; and a water repellent coating formed on the inner step and an inner surface surrounding each of the first through holes; and a cover member for coupling with the holding member and facing the inner steps of the holding member, the cover member including a plurality of second through holes communicating with the first through holes of the holding member.

13. The apparatus for holding optical lenses according to claim 12, wherein the first through holes of the holding member are arranged in columns and rows.

14. The apparatus for holding optical lenses according to claim 12, wherein the first through holes of the holding member are arranged in a staggered fashion.

15. The apparatus for holding optical lenses according to claim 12, wherein the first through holes each include a first opening facing the cover member and a second opening opposite to the cover member, wherein a minimum breadth of the first opening is greater than a minimum breadth of the second opening.

16. The apparatus for holding optical lenses according to claim 15, wherein the first openings of the first through holes each have an enlarged section proximate to the cover member, the enlarged section being progressively constricted inward.

17. The apparatus for holding optical lenses according to claim 15, wherein the second through holes of the cover member each have an opening facing the holding member, and the openings of the second through holes have less breadth than the first openings of the first through holes of the holding member.

18. An apparatus for holding optical lenses, the apparatus comprising:

a holding member comprising a plurality of first through holes, each of the plurality of first through holes comprising a first portion for receiving an optical lens therein and a second portion being in communication with the first portion, a minimum breadth of the first portion being greater than a minimum breadth of the second portion; and a cover member attached to the holding member, the cover member comprising a plurality of second through holes corresponding to the first through holes of the holding member, the second through holes being in communication with the first portions of the first through holes respectively, a breadth of the second through holes being less than that of the first portions of the first through holes, wherein the first portions of the first through holes each have an enlarged section proximate to the cover member, the enlarged section being progressively constricted inward.

* * * * *